United States Patent

Alms

[15] 3,638,858
[45] Feb. 1, 1972

[54] TEMPORARY HEATING SYSTEM FOR MULTILEVEL BUILDINGS

[72] Inventor: Erhard E. Alms, 419 Valencia Ave., Barrington, Ill. 60010

[22] Filed: Jan. 5, 1970

[21] Appl. No.: 543

[52] U.S. Cl. ............................................ 237/50, 263/19 A
[51] Int. Cl. ..................................................... F24d 5/02
[58] Field of Search ...................... 263/19; 237/50, 53, 59; 126/110 C

[56] References Cited

UNITED STATES PATENTS

| | | |
|---|---|---|
| 1,706,199 | 3/1929 | Wagner .............................. 263/19 X |
| 2,579,158 | 12/1951 | Scheu ................................. 263/19 |
| 3,050,111 | 8/1962 | Hubbard et al. ................. 263/19 X |

Primary Examiner—Edward G. Favors
Attorney—Charles F. Voytech

[57] ABSTRACT

A temporary heating system for buildings under construction requiring hot air for drying plaster, paint, mortar and the like. A portable high-capacity burner is placed in a doorway leading to the outside of the building on the lowest floor to be heated. The burner is baffled to have the burner intake outside the building and the hot products of combustion and air blown inside into an elevator shaft which then conducts the hot air to the upper levels. The elevator doors and the windows of the building are used as flow regulators for their respective floors.

2 Claims, 5 Drawing Figures

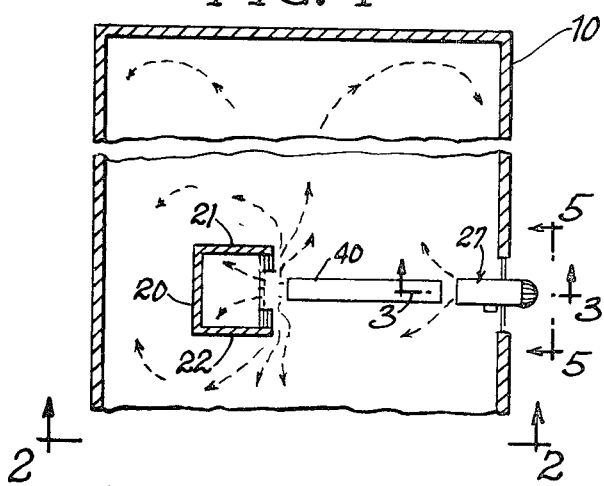
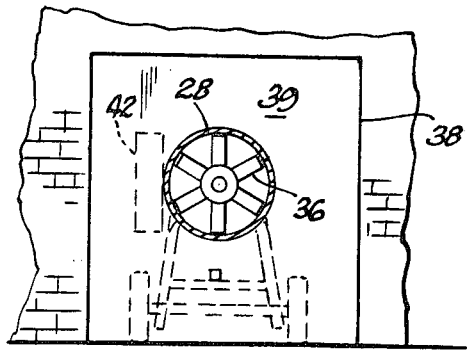
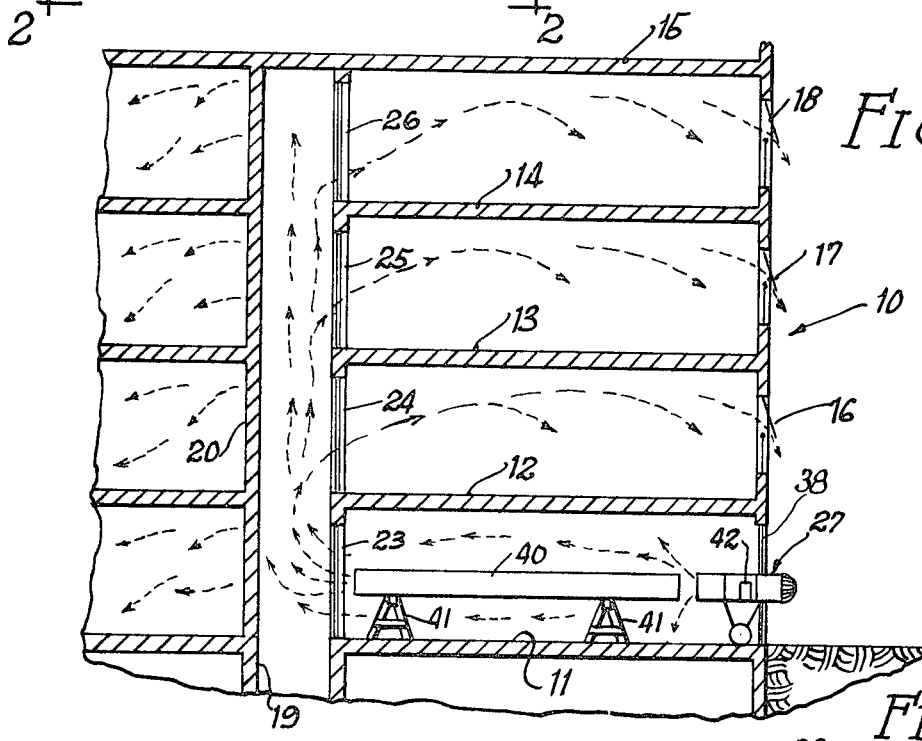
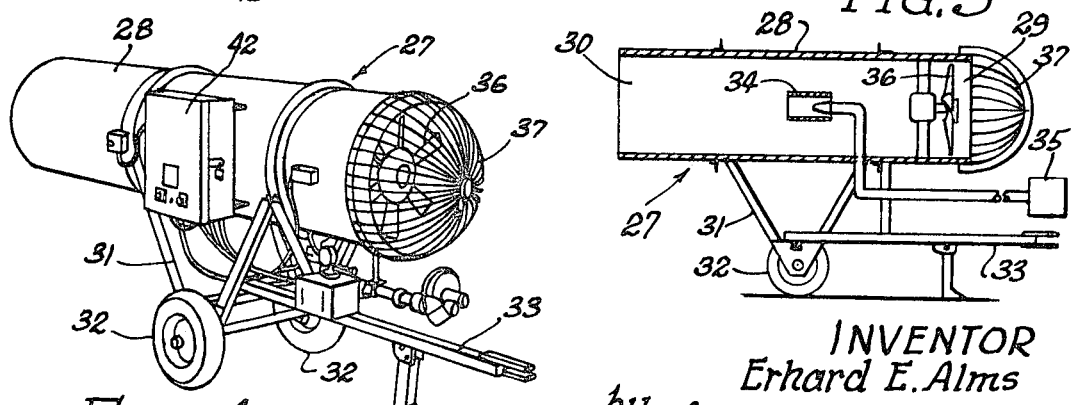
INVENTOR
Erhard E. Alms
by Charles F. Voytech
Att'y

TEMPORARY HEATING SYSTEM FOR MULTILEVEL BUILDINGS

This invention relates to temporary heating systems for buildings under construction, or whose heating plant is not functioning.

In multilevel buildings under construction or undergoing extensive remodeling, certain construction materials such as plaster, dry wall, mortar, cement, paint, wallpaper, etc., must be dried as evenly and as rapidly as possible to prepare the building for early occupancy. This means that uniformly hot dry air in adequate quantities must be circulated throughout the building during the drying period and for such time as the external air temperature may be at a damaging level. At these times the heating plant for the building, particularly in new construction, may not be operational so that it becomes necessary to provide a temporary source of hot air for the building until its own heating plant can be put in operation.

Heretofore, temporary heating units for buildings under construction have taken the form of small individual burners, usually oil fired, and of a capacity sufficient to supply, at best, one floor of the building with hot dry air. No provision was made in the burners for automatically limiting the maximum temperature of the hot air emanating therefrom so that they could not be left unattended for fear that they would overheat.

The principal object of this invention is to provide a temporary heating system for large buildings under construction the capacity of which is large enough to supply the entire building, including all floors thereof, with adequate quantities of hot, dry air to promote drying of construction materials used therein.

As a more specific object, this invention has within its purview the provision of a temporary heating system for a multilevel building having a vertical shaft such as an elevator shaft or a stair well, the shaft having doors opening on each level, wherein use is made of the shaft and doors in connection with a compact, high-capacity portable heating unit to distribute hot air from the heating unit to all levels of the building.

These and other objects of this invention, will become apparent from the following detailed description when taken together with the accompanying drawings, in which:

FIG. 1 is a fragmentary plan view of a single level in a multilevel building showing the temporary heating system of this invention as used therein;

FIG. 2 is an enlarged elevational view of the building and heating system of FIG. 1;

FIG. 3 is a still further enlarged side elevational view in section of the heating unit taken along line 3—3 of FIG. 1;

FIG. 4 is an elevational view in perspective of the heating unit of FIG. 3; and

FIG. 5 is an enlarged end elevational view of the heating unit of FIG. 1 as installed.

In its preferred form, this invention is comprised of a high-capacity burner and blower in the form of a cylinder, mounted on a wheeled frame to provide portability for the unit. Any suitable fuel supply may be used, but it may take the form of gas piped to the unit from a city natural gas main, or from a tank of propane gas. The size of the unit may be selected to adapt it for a relatively wide range of building sizes to be heated, and the output of the unit may thus be adjusted to furnish from 500,000 B.t.u.'s per hour to 2,000,000 B.t.u.'s per hour. A blower on the unit mixes the outside air with the products of combustion. The unit is installed in a doorway or window on the lowermost level of the building to be heated, with the intake end extending out of the doorway. The output end is directed toward an open elevator shaft and the elevator doors on upper levels opening on the shaft serve as valves to admit desired amounts of heated air to the level associated with the door.

Referring now to the drawings for a detailed description of the invention, and particularly to FIGS. 1 and 2, the invention is shown applied to a multilevel building 10 having a ground floor 11 and upper floors 12, 13 and 14. For purposes of illustration the building is shown as having a roof 15, but said roof may in fact be the next higher floor which, although formed, may not be ready for heating, i.e., the materials requiring heating for their drying and setting have not yet been applied to that floor. Each of the floors 11 to 14 are shown completed to the extent that windows 16, 17 and 18 have been installed so that such heated air as may be supplied to floors 11–14 can be retained in these levels, or allowed to leave at a controlled rate through windows 16, 17 and 18 as it becomes saturated with moisture, to be replaced by hot dry air.

Building 10 will have an elevator shaft 19 extending vertically from the ground level 11 through each of the levels above, said shaft in the illustrative example having continuous rear and side walls 20, 21 and 22, and a front wall in which may be provided elevator doors 23, 24, 25 and 26, should the construction of the building be advanced to the point where such doors have been installed. Said doors 23–16, if installed, may be used to control the entrance of air from elevator shaft 19 to the levels associated with said doors.

Hot dry air is supplied to building 10 by a high-capactiy portable heater 27 shown in FIGS. 3 and 4. In the example illustrated, the heater is in the form of a cylindrical sheet metal tube 28 having an inlet end 29 and an outlet end 30. Tube 28 is mounted on a frame 31 which is, in turn, mounted on a pair of spaced wheels 32 on which heater 27 may be wheeled from place to place. A tongue 33 is provided by which heater 27 may be pushed or pulled, either manually, or by appropriate automotive power.

Within tube 28 is disposed a burner 34 which is preferably of the gas type because of the cleanliness of its products of combustion. Said burner may be supplied with gas from a source 35 which may be a portable container of propane gas or a city main containing natural gas supplied by a public utility. Air for combustion and for mixing with the products of combustion is provided by a motor-driven fan 36, the inlet to which is protected by a screen 37.

Heater 27 is placed in a doorway or low window 38 (FIG. 5) on the lowest floor to be heated. In the building illustrated herein, this is the ground floor 11, but in a building of many floors the heater may be moved up to higher levels as the lower levels are completed. The doorway is closed by a temporary covering or baffle 29 of plywood, steel, or heavy cloth, and an opening is made in covering 39 through which inlet end 29 and tongue 13 extend to the exterior of the building.

It may be noted that tube 28 is relatively short and although the gases issuing therefrom are directional so that they will travel in the direction in which the outlet end 30 is pointed, tube 28 may of necessity be located some distance from door 23 so that the hot gases may be dissipated throughout ground floor 11 and the pressure thereof diminished at door 23 to the point where not enough gases enter elevator shaft 19 to heat the upper levels adequately, while the ground floor receives too much of these gases. To alleviate this condition a temporary cylindrical duct 40 (FIGS. 1 and 2) is used. This duct may be made of sheet metal or alternatively, of canvas or sheet plastic and made sufficiently rigid by any appropriate supporting means (not shown) to retain its intended cross-sectional shape. Although a cylindrical shape conforms most closely to the cross section of tube 28, other shapes, such as square or rectangular will also be effective. Duct 40 is supported on spaced frames 41 so that it is coaxially disposed with reference to tube 28, and it is of a length to extend approximately from tube 28 to door 23 of elevator shaft 19.

It is not intended that duct 40 conduct to elevator shaft 19 all of the gases issuing from heater 27, but only the excess over the amount required on ground floor 11. Duct 40, therefore, is located a short distance from end 30 to leave a space 42 between the duct and end 30 so that some of the gases escape around the outside of duct 40 into the ground floor area. The amount of gases escaping can be regulated by changing the spacing between duct 40 and tube 28, or by selecting a duct which is of smaller cross section than tube 28. In this latter case, space 42 may be considerably, reduced and with appropriate differences in cross-sectional area between the duct and tube, eliminated entirely.

The circulation of the hot gases throughout building 10 is shown by arrows in FIGS. 1 and 2. Those not escaping through space 42 into the ground level 11 pass through tube 40 and into elevator shaft 19 where they rise and escape through doors 24, 25 and 26 into levels 12, 13 and 14. By regulating the degree of opening of doors 24, 25 and 26, the quantity of gas entering each level is regulated. Entrance of gases into a level is also regulated by the degree of opening of the windows on that level, the level on which the windows are open the widest receiving the greatest volume of gases.

Heater 27 is provided with automatic controls located in a box 42 mounted on the side of tube 28. Said controls are of a type presently supplied with grain dryers manufactured by American Dryer Division of AFE Industries, Inc. located at 340 East Main Street, Lake Zurich, Illinois. These include a thermostatic upper temperature control which automatically shuts off burner 34 when the temperature in the vicinity of the heater exceeds a predetermined value. Included also is a control for making certain that air is flowing through tube 28 before burner 34 is operated, and a manual reset gas valve for maximum safety.

In the typical example of heater described above, i.e., one having a capacity of 500,000 B.t.u.'s to 2,000,000 B.t.u.'s per hour, fan 36 may have a diameter of 18 inches and deliver 8,000 c.f.m. of air to the burner.

Although the foregoing temporary heating system has been described with reference to its use as a means for drying construction materials, it can, of course, be used to supply heat to a building which is of skeletal form, without walls and windows, but which has been supplied with temporary plastic or canvas walls so that workmen installing basic piping, sewers and conduits can work in relative comfort on very cold days. Also where the building has no elevator shaft, but has a stair well with doors opening upon the stair well, duct 40 may be directed into the well to supply hot air to upper levels in the building. On the other hand, where duct work in a building is completed, but the heating unit for the building is not operational, duct 40 may be a part of the completed ductwork, and the hot air from burner 27 may be directed throughout the building by said ductwork. It is understood, therefore, that the foregoing description is merely illustrative of a preferred embodiment of the invention and that the scope of the invention is not to be limited thereto, but is to be determined by the appended claims.

I claim:

1. In combination a multilevel building and a temporary heating system therefor, said system comprising a tubular burner for generating a continuous stream of hot gases, said burner being disposed in a substantially horizontal position on a lower level within the building and having inlet and outlet openings, said building having an opening to the outside thereof at said lower level, a baffle for the opening in the building and extending around the burner to expose the air inlet of the burner to the outside of the building and to shield the hot gases from the outside at said building opening, a vertical shaft in the building for access to upper levels therein, said shaft having door openings at a plurality of building levels, the outlet opening for the burner directing the stream of hot gases from the burner toward said shaft to direct hot gases thereinto, said door openings in the shaft being selectively manipulatable for regulating the amount of hot gases entering each of the building levels.

2. A temporary heating system as described in claim 1, a duct interposed between the outlet of the burner and the shaft for conducting a major portion of the hot gases from the burner to the shaft, said duct being spaced from the burner to permit the remainder of the hot gases to pass around the duct into said lower level.

* * * * *